United States Patent [19]

Fagerburg et al.

[11] Patent Number: 4,877,851
[45] Date of Patent: Oct. 31, 1989

[54] BLENDS OF COPOLY(ARYLENE SULFIDE) AND POLY(ARYLENE SULFIDE)

[75] Inventors: David R. Fagerburg; Joseph J. Watkins; Paul B. Lawrence, all of Kingsport, Tenn.

[73] Assignee: Eastman Kodak Company, Rochester, N.Y.

[21] Appl. No.: 224,509

[22] Filed: Jul. 25, 1988

[51] Int. Cl.$^4$ .................... C08L 81/02; C08G 75/14
[52] U.S. Cl. ..................... 525/537; 525/535
[58] Field of Search ......................... 525/537

[56] References Cited

U.S. PATENT DOCUMENTS

| | | |
|---|---|---|
| 2,513,188 | 6/1950 | Macallum . |
| 2,538,941 | 1/1951 | Macallum . |
| 4,292,416 | 9/1981 | Shue et al. ............ 525/537 |
| 4,786,713 | 11/1988 | Rule et al. ............ 528/389 |

FOREIGN PATENT DOCUMENTS

| | | | |
|---|---|---|---|
| 189895 | 8/1986 | European Pat. Off. ............ 525/537 |
| 237006 | 9/1987 | European Pat. Off. . |
| 11357 | 1/1984 | Japan . |
| 1087752 | 5/1986 | Japan ................... 525/537 |

Primary Examiner—John C. Bleutge
Assistant Examiner—David W. Woodward
Attorney, Agent, or Firm—Charles R. Martin; William P. Heath, Jr.

[57] ABSTRACT

A composition comprising an admixture of
(A) from 99.9 to 90 weight percent, based on the weight of the admixture, of a copoly(arylene sulfide) corresponding to the structure $$[(-A-S)_{1-x}(-A-S-S)_x]_n$$

wherein A is a divalent substituted or unsubstituted aromatic radical, x is in the range of 0.5 to 0.001 and n is at least 200, and
(B) from 0.1 to 10 weight percent, based on the weight of the admixture, of a poly(arylene sulfide) corresponding to the structure $$(-A-S-)_r$$

A is the same as above and where r is at least 25.

5 Claims, No Drawings

BLENDS OF COPOLY(ARYLENE SULFIDE) AND POLY(ARYLENE SULFIDE)

The invention relates to blends of a copoly(arylene sulfide) and a poly(arylene sulfide).

Poly(arylene sulfide) resins are thermoplastic polymeric materials with good thermal stability, unusual insolubility, resistance to chemical environments and inherent flame resistance. Poly(arylene sulfide) resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Poly(phenylene sulfide) is prepared commercially by reacting p-dichloro-benzene with sodium sulfide in a polar organic solvent to produce poly(phenylene sulfide) and the by-product sodium chloride. This process is known as the Edmonds-Hill polymerization procedure and the basic process is disclosed in U.S. Pat. No. 2,513,188 and U.S. Pat. No. 2,538,941. An improvement on this procedure involves adding N-haloamides as catalysts.

Recently copoly(arylene sulfide) have been discovered. These polymers are disclosed in Ser. No. 117,722, now U.S. Pat. No. 4,786,713 and can be described as having repeating units corresponding to the structure

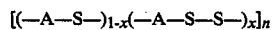

$$[(-A-S-)_{1-x}(-A-S-S-)_x]_n$$

wherein x is in the range of 0.5 to 0.001, A is aromatic and n is at least 200 and is preferably in the range of 500 to 5,000 as determined by melt viscosity measurement at 300° C.

It has now been discovered that the rate at which the copoly(arylene sulfide) crystallizes can be increased by blending poly(arylene sulfide) with the copoly(arylene sulfide). This blend can be described as an admixture of (A) from 99.9 to 90 weight percent, based on the weight of the admixture, of a copoly(arylene sulfide) corresponding to the structure

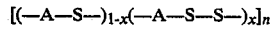

$$[(-A-S-)_{1-x}(-A-S-S-)_x]_n$$

wherein A is a divalent substituted or unsubstituted aromatic radical, x is in the range of 0.5 to 0.001 and n is at least 200, and
(B) from 0.1 to 10 weight percent, based on the weight of the admixture, of a poly(arylene sulfide) corresponding to the structure

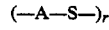

$$(-A-S-)_r$$

A is the same as above and where r is at least 25.

In the process used to prepare the copoly(arylene sulfide) useful in this invention a diiodoarylene compound corresponding to the structure

I—A—I where A is a divalent arylene radical is reacted with elemental sulfur to produce the substantially linear copoly(arylene sulfide) having both (—A—S—) units and (—A—S—S—) units.

Diiodoaromatic compounds which can be utilized in the present process include unsubstituted or substituted aromatics which have two iodine substituents. Suitable diiodoaromatic compounds include hydrocarbon aromatics, nitrogen-containing aromatics, sulfur-containing aromatics and oxygen-containing aromatics. Typical hydrocarbon aromatics include benzene and biphenyl, and condensed ring aromatics such as naphthalene and anthracene. Typical sulfur-containing aromatics include, for example, thiophene and benzothiophene. Typical nitrogen-containing aromatics include pyridine and quinoline. Suitable oxygen-containing aromatics are, for example, furan, dibenzofuran, etc. Substituted diiodoaromatic compounds suitable for use with the present invention include aromatic sulfones, diarylethers, diarylcarbonyls, diarylsulfides and the like.

The aromatic starting materials may be substituted by one or more alkyl groups, preferably alkyl groups having from 1-6 carbon atoms. Specially preferred alkyl groups are methyl, ethyl, propyl and butyl groups. There is no limitation on the spatial arrangement of the substituents, for example, the substituents may be on a carbon adjacent to an iodine bearing carbon or may be on a carbon atom further removed from the iodine bearing carbon.

Additional substituents on the aromatic compounds may include phenyl, halogen, hydroxy, nitro, amino, $C_{1-6}$ alkoxy, and carboxylate and carboxylic acid substituents, as well as aryl sulfones and aryl ketones.

Preferred diiodoaromatic compounds are the diiodobenzenes, diiodonaphthalenes, diiodobiphenyls, diiododiphenyl ethers and diiodotoluenes which may be unsubstituted or substituted with any of the substituents noted above.

Specific diiodoaromatic compounds suitable for the present invention include p-diiodobenzene, m-diiodobenzene, p,p'-diiodobiphenyl, m,p'-diiodobiphenyl, p,p'-diiododiphenyl sulfone, p,p'-diiododiphenyl ether, 2,6-diiodonaphthalene, and p,p'-diiodobenzophenone. p-diiodobenzene, p,p'-diiodobiphenyl, and p,p'-diiododiphenyl ether are most preferred.

The diiodoaromatic starting materials of the present invention may be prepared by any suitable process. For example, the diiodoaromatic compounds may be prepared by standard liquid or gas phase iodination reactions. Although the diiodoaromatic compounds may be prepared by any such process, the preferred method of preparing the diiodoaromatic starting materials is that disclosed in Ser. No. 912,806, filed Sept. 9, 1986, now U.S. Pat. No. 4,746,758.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6-12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98 percent-100 percent, although sulfur having a lower degree of purity may be used. This lack of sensitivity to the presence of impurities in the sulfur is advantageous to the present process when used as a commercial process since highly purified sulfur is not required and the associated expense is not incurred.

In the process used to prepare the copoly(arylene sulfide) of this invention sulfur reacts with a diiodoaromatic compound, eliminating elemental iodine and forming the copoly(arylene sulfide) as shown below.

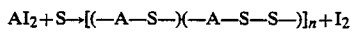

The formation of polymer is not sensitive to the relative stoichiometry of the diiodoaromatic compound and sulfur. Accordingly, an excess of sulfur or an excess of diiodoaromatic compound may be used in the polymerization process. When excess sulfur is used, some disulfide linkages are observed in the polymer. Decreasing amounts of dulfur result in decreasing levels of disulfide linkages in the final polymer. When the diiodoaromatic compound is present in excess, polymerization to high polymer can still occur, if the excess diiodoaromatic compound is removed during final polymerization.

The polymerization reaction is preferably carried out in the absence of solvent by merely heating and reacting the sulfur and diiodoaromatic compound. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfur, one might use benzene, toluene or naphthalene as a solvent.

It is also possible to perform the polymerization reaction by solid state polymerization. Solid state polymerization enables very high molecular weights and melt viscosities to be achieved. After an initial melt polymerization (or alternatively solution polymerization) has been performed, the product is cooled to a solid state. Further heating and polymerization in the solid state under vacuum or inert gas flow dramatically increases the molecular weight allowing weight average molecular weights in excess of 100,000 to be achieved. It is significant to note that substantially no cross-linking occurs during the solid state or melt polymerization processes. The very high molecular weight copolymers which are produced after the solid state polymerization are still substantially linear and have excellent film and fiber forming properties.

During the polymerization reaction between the diiodoaromatic compound and sulfur elemental iodine is produced and evolves from the reaction melt, solution, or solid. Removal of the elemental iodine provides a driving force for completion of the polymerization reaction. The iodine may be removed by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore, does not result in wasted reaction products since both the copoly(arylene sulfide) and elemental iodine are useful commercial chemical products.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175°–400° C. will be suitable, although for particular diiodoaromatic compounds temperatures in excess of 400° C. may be used. Particularly preferred temperature ranges are from about 180°–350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

The poly(arylene sulfide) and the manner in which it is prepared is well known in the art and described in U.S. Pat. No. 2,513,188 and U.S. Pat. No. 2,538,941.

The blends of this invention can be prepared by known techniques for blending polymers. For example, the polymers can be coextruded in convention twin screw extrusion equipment. Also both polymer may be powdered and the powders throughly mixed in a single screw extruder. Preferably the poly(arylene sulfide) is added to the monomers used to prepare the copoly(arylene sulfide).

The amount of copoly(arylene sulfide) can be from 99.9 to 90 weight percent, preferably 99.8 to 95 weight percent, based on the weight of the admixture. The amount of poly(arylene sulfide) can be from 0.1 to 10 weight percent, preferably 0.2 to 5 weight percent, based on the weight of the admixture.

The admixture of this invention is useful for preparation of various shaped articles such as pellets, fibers and molded articles. The polymer can be prepared into these shaped articles by conventional processes, such as injection molding, melt spinning, and melt extrusion.

EXAMPLES

Example 1

This example illustrates the preparation of a copoly(-phenylene sulfide) and its slow crystallization rate.

Into a 500-mL, 3-neck, round bottom flask are weighed the following: 32 g sulfur (0.998 mol), 410.0 g p-diiodobenzene (1.24 mol, 24.5 mol percent excess), 6.5 g 4-iodobiphenyl (0.0229 mol), and 0.8 g of 1,3-diiodo-5-nitrobenzene. The flask was fitted with a 350 mm long Vigreux column, a mechanical stirrer through the center joint, and an inlet tube for a slow air sweep. The column was attached via a distillation head and a take-off tube to a distillation receiver which was cooled in dry ice. The receiver was connected to a vacuum source. The flask was maintained at 200 torr pressure and immersed in a metal bath controlled at 230° C. It was held under these conditions for 2.5 hr, at which time the bath temperature was raised to 240° C. After 1.5 hr, the pressure was reduced to 120 torr, held for 0.5 hr and then reduced to 60 torr where it was held for an additional 0.5 hr. The pressure was again reduced to 30 torr, held for 0.5 hr, and then reduced to 1 torr, the bath temperature raised to 250° C. and held there for 1 hr. The temperature was then raised to 300° C. and held there for 30 minutes. The reaction flask was removed from the metal bath, repressurized with nitrogen, and allowed to cool under nitrogen. The crystallization rate of the polymer was rather slow as determined by a Tcc of 180° C. and a Tch of 164° C. as determined by DSC.

EXAMPLE 2

This example illustrates the faster crystallization rate of the admixture of the invention composed of copoly-(arylene sulfide) and poly(phenylene sulfide).

The preparation of Example 1 was repeated with the addition of 6.0 g (5.0 weight percent based on the weight of the admixture) of Ryton P4, a commercially available poly(phenylene sulfide). The admixture of the two polymers had a Tch of 132° C. and a Tcc of 225° C. as determined by DSC. These values indicate a much more rapid rate of crystallization than for copoly(phenylene sulfide) alone.

EXAMPLE 3

This example also illustrates the faster crystallization rate of the admixture of this invention.

Example 2 was repeated except that the amount of poly(phenylene sulfide) was 2.5 weight percent. The admixture exhibited a Tch of 132° C. and a Tcc of 230° C. as determined by DSC which indicated a much more rapid rate of crystallization for the admixture compared to only copoly(phenylene sulfide).

EXAMPLE 4

Example 2 is repeated except that the amount of poly(phenylene sulfide) was 1.25 weight percent. The admixture exhibited a Tch of 135° C. and a Tcc of 222° C. as determined by DSC, which indicated a much more rapid rate of crystallization for the admixture compared to only copoly(phenylene sulfide).

EXAMPLE 5

Example 1 is repeated except that the amount of poly(phenylene sulfide) was 0.625 weight percent. The admixture exhibited a Tch of 144° C. and a Tcc of 210° C. as determined by DSC, which indicated a much more rapid rate of crystallization for the admixture compared to that of only copoly(phenylene sulfide).

We claim:

1. A composition comprising an admixture of
   (A) from 99.9 to 90 weight percent, based on the weight of the admixture, of a copoly(arylene sulfide) corresponding to the structure $$[(-A-S)_{1-x}(-A-S-S)_x]_n$$

wherein A is a divalent substituted or unsubstituted aromatic radical, x is in the range of 0.5 to 0.001 and n is at least 200, and
   (B) from 0.1 to 10 weight percent, based on the weight of the admixture, of a poly(arylene sulfide) corresponding to the structure $$(-A-S-)_r$$

A is the same as above and where r is at least 25.

2. The composition of claim 1 wherein the aromatic radical is phenylene, biphenylene, diphenyl ether, or naphthalene.

3. The composition of claim 2 wherein the aromatic radical is unsubstituted phenylene or biphenylene.

4. The composition of claim 3 wherein the aromatic radical is unsubstituted phenylene.

5. A composition comprising admixture of
   (A) from 99.8 to 95 weight percent, based on the weight of the admixture, of a copoly(phenylene sulfide) corresponding to the structure $$[(-A-S)_{1-x}(-A-S-S)_x]_n$$

wherein A is a divalent unsubstituted phenylene radical, x is in the range of 0.5 to 0.001, and n is at least 400, and
   (B) from 0.2 to 5 weight percent, based on the weight of the admixture, of a poly(phenylene sulfide) corresponding to the structure $$(-A-S-)_r$$

where A is the same as above and r is at least 25.

* * * * *